United States Patent [19]

Chandler

[11] Patent Number: 5,411,060
[45] Date of Patent: May 2, 1995

[54] COMPOSITE PIPE

[76] Inventor: Brian Chandler, 8933 St. Gallen 60, Steiermark, Austria

[21] Appl. No.: 878,660

[22] Filed: May 5, 1992

Related U.S. Application Data

[63] Continuation-in-part of Ser. No. 863,563, Apr. 3, 1992, abandoned.

[51] Int. Cl.⁶ .............................................. F16L 11/08
[52] U.S. Cl. ................................ 138/98; 138/111; 138/114; 138/103
[58] Field of Search ............... 138/98, 97, 103, 104, 138/140, 141, 153, 111, 114; 156/287

[56] References Cited

U.S. PATENT DOCUMENTS

| | | | |
|---|---|---|---|
| 3,823,565 | 7/1974 | Takada | 61/72.1 |
| 4,009,063 | 2/1977 | Wood | 156/71 |
| 4,334,943 | 6/1982 | Zenbayashi | 138/98 |
| 4,350,548 | 9/1982 | Zenbayashi et al. | 138/98 |
| 4,368,091 | 1/1983 | Ontsuga et al. | 138/98 |
| 4,786,345 | 11/1988 | Wood | 156/156 |
| 4,836,715 | 6/1989 | Wood | 138/98 X |
| 4,883,557 | 11/1989 | Morinaga et al. | 138/98 |
| 5,010,440 | 4/1991 | Endo | 138/97 |
| 5,172,730 | 12/1992 | Driver | |

FOREIGN PATENT DOCUMENTS

| | | |
|---|---|---|
| 0155406 | 9/1985 | European Pat. Off. |
| 2188695 | 10/1987 | United Kingdom |
| WO83/02748 | 8/1983 | WIPO |

Primary Examiner—David A. Scherbel
Assistant Examiner—Patrick Brinson
Attorney, Agent, or Firm—Cowan, Liebowitz & Latman

[57] ABSTRACT

A composite pipe suitable for advanced gas distribution is formed of a first elastomeric resin impregnated outer felt tube reinforced longitudinally, and a second inner felt tube impregnated with an uncured resin which is more rigid than the elastomeric resin and coated on at least the inside surface with a styrene resistant gas impermeable layer and reinforced in the longitudinal and radial directions. The inner tube has a nominal outside diameter greater than the nominal inside diameter of the outer tube. After installation the inner tube is pressurized to expand the outer tube and the uncured resin is cured activating the heat sensitive to bond the two tubes together and cure the pipe with the outer tube in the expanded condition.

9 Claims, 5 Drawing Sheets

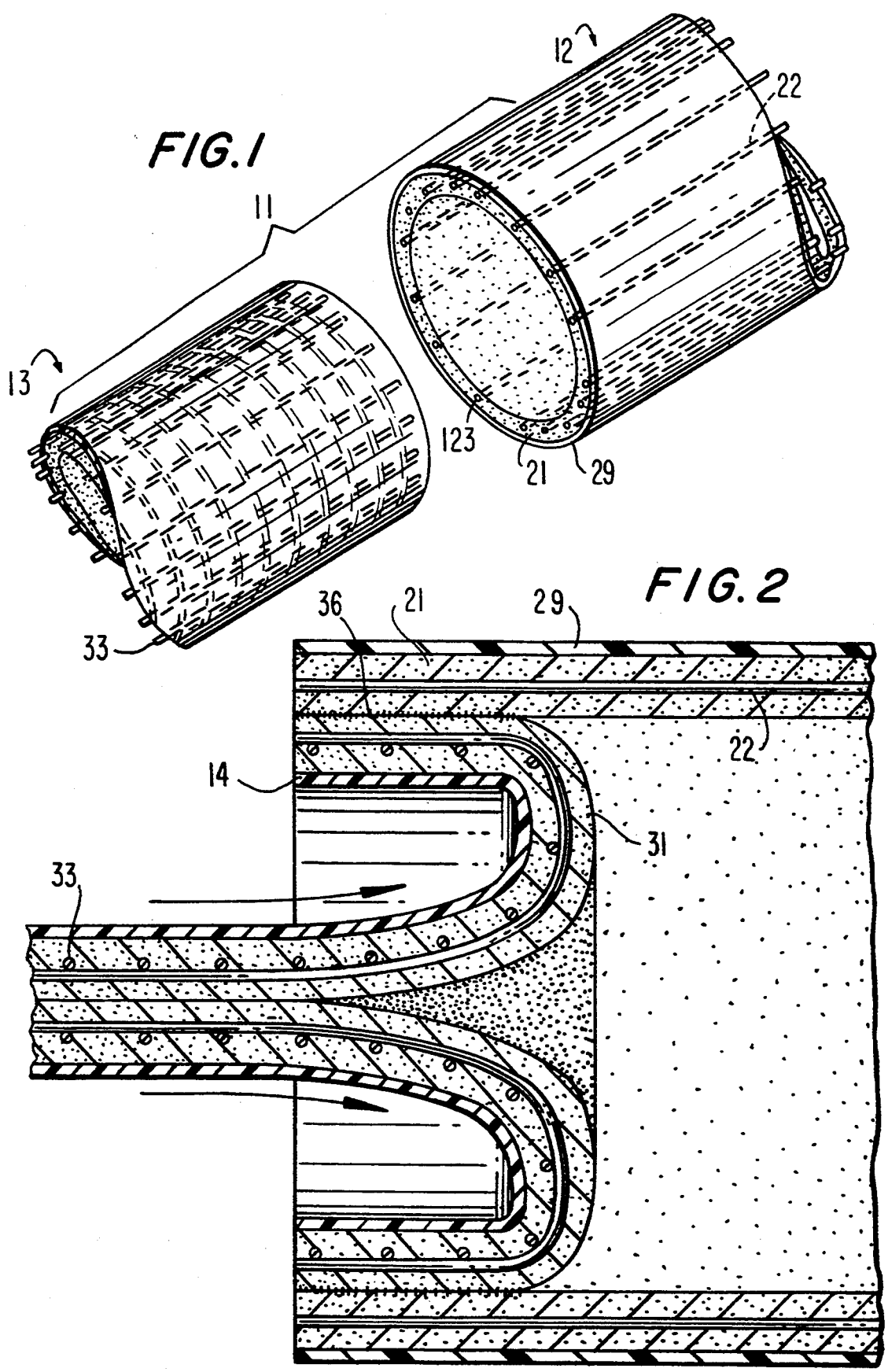

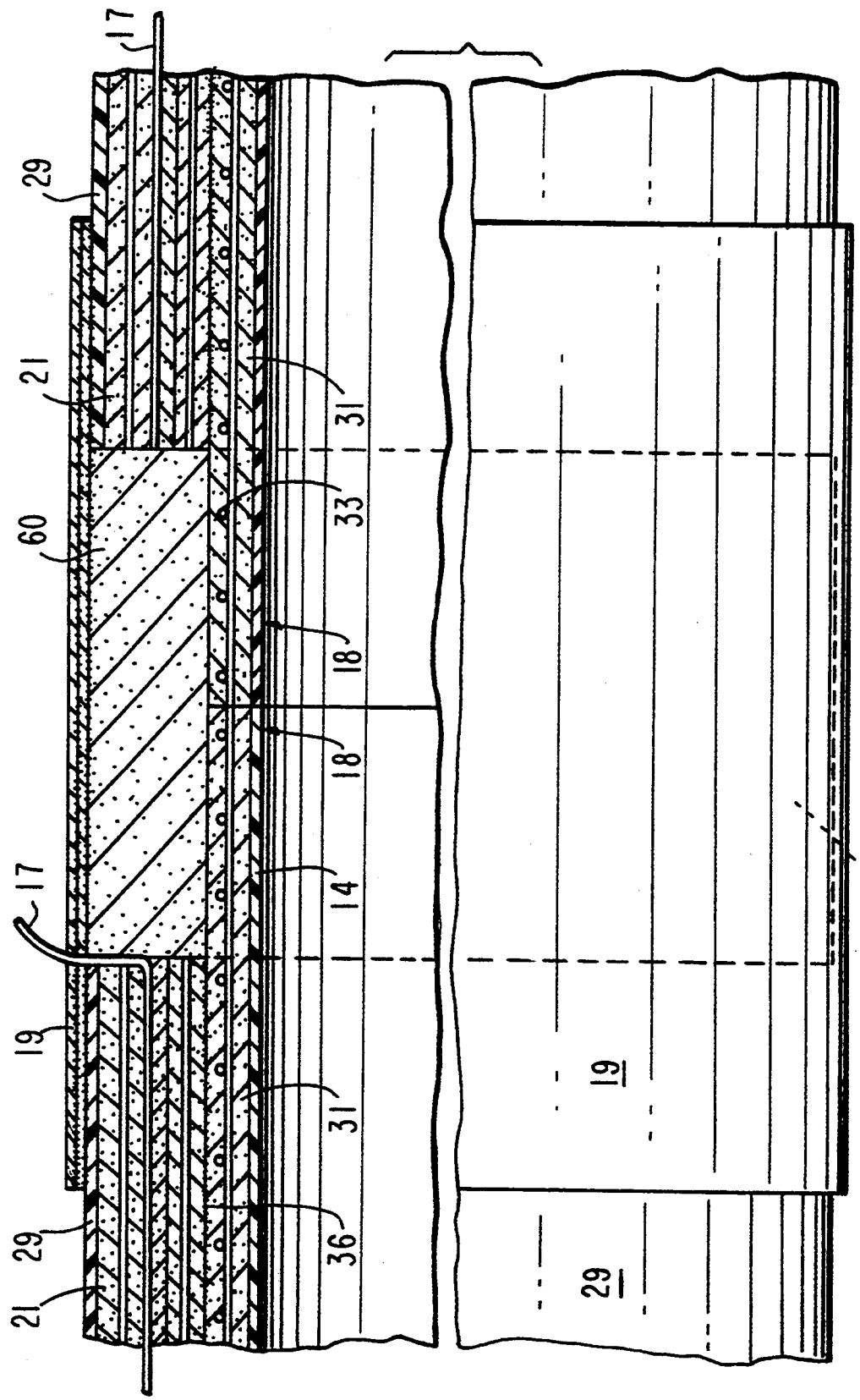

COMPOSITE PIPE

CROSS-REFERENCE TO RELATED APPLICATIONS

This application is a continuation-in-part of application Ser. No. 07/863,563, filed Apr. 3, 1992, now abandoned.

BACKGROUND OF THE INVENTION

This invention relates to composite pipes, and more particularly, composite pipes suitable for advanced gas distribution systems designed to meet the diverse performance requirements of such pipes.

Much research work is presently underway to define and provide an idealized pipe suitable for use in advanced gas distribution systems. Such pipes must meet a wide variety of design requirements required by the gas utility and allied industries. An idealized pipe designed to meet these requirements should be lightweight, connectable and compatible. It should be suitable to be fabricated in long lengths of at least 1,000 feet. At the same time the pipe prior to installation should be sufficiently flexible to be wound on a drum or spool to facilitate storage and transportation to the installation site.

The idealized pipe must be locatable accurately after installation. It should have an inner layer which acts as a barrier to keep the gas within the inner lumen of the pipe. This inner layer should be smooth to reduce energy costs. The installed pipe must maintain structural integrity and permit detection of leaks through the inner layer barrier. The outer portion of the pipe need be corrosion resistant and abrasion resistant.

The principal criteria for selecting such a pipe suitable for gas distribution systems must meet the following criteria. These are:
1. provide long service life under normal use;
2. be capable of tolerating damaging incidents;
3. be easy to install, maintain and repair; and
4. be readily manufacturable.

These criteria are defined in a draft task report entitled Preliminary Design Concepts For An Advanced Gas Distribution System prepared by Batelle Institute in Columbus, Ohio for Gas Research Institute in August, 1990. This Preliminary Design Report reviews a wide variety of design criteria and materials, such as monolithic engineering thermoplastics, toughened engineering thermoplastics, thermoplastic elastomers and a wide variety of other polymer blends. Reinforced materials are suggested as are various hybrid constructions which include a monolithic pipe in a multiple layer product. Various types of hose designs are also considered along with elastic honeycombs designs. The objective of the Report was to set forth various concepts without specifically identifying a particular construction which would be suitable.

Accordingly, it is desirable to provide a composite pipe construction, suitable for use in advanced gas distribution systems, which satisfies the criteria required for such use.

SUMMARY OF THE INVENTION

Generally speaking, in accordance with the invention, a partially cured composite pipe can be fabricated in sufficiently long lengths suitable for use in advanced gas distribution systems and is sufficiently flexible for convenient storage prior to installation. The pipe includes a first outer resin impregnated needled felt tube reinforced with longitudinal reinforcing members for limiting longitudinal stretch of the pipe. A second inner resin impregnated and uncured felt tube having a nominal outside dimension greater than the nominal inside dimension of the outer tube is placed within the outer tube. The outer tube may be formed in a multiple wall configuration with a felt layer including a hydrocarbon detecting wire for detecting gas leaks.

The inner tube is reinforced in both the longitudinal and radial directions with reinforcing members for limiting elongation and expansion. The inner tube is coated on at least the inside surface with a synthetic resin layer which is styrene resistant and impermeable to gas.

When the composite pipe is installed, one end is inflated with fluid under sufficient pressure to inflate the first and second tubes to a substantially round condition. A curing device, such as an ultrasonic cylinder or ultraviolet light source, for curing the resin is transported through the lumen of the pipe. Fluid pressure is maintained to keep the first tube stretched as the inner tube is cured. The glue is activated by the heat of curing and securely bonds the two tubes together.

The composite pipe in accordance with a preferred embodiment of the invention is fabricated, prior to installation, with the inner tube impregnated with a curable resin which may be catalyzed by ultraviolet light or ultrasound. The outside surface of the inner tube is coated with a synthetic resin which is resistant to styrene and impermeable to gas. The inside surface of the second tube may be coated with a heat sensitive adhesive. The second tube is then inverted into the first tube so that the adhesive is disposed on the outside of the second tube between the now outer surface of the inner tube and the inner surface of the outer tube.

Accordingly, it is an object of the invention to provide an improved composite pipe suitable for use in advanced gas distribution systems.

Another object of the invention is to provide a composite pipe for gas distribution systems formed of an impact resistant first outer cured resin impregnated felt tube and a second tube within the first tube resistant to the transfer of gas and curable after installation and expansion.

A further object of the invention is to provide a method for manufacture of a composite pipe suitable for advanced gas distribution systems.

Yet another object of the invention is to provide a method of installation of partially cured composite pipe suitable for advanced gas distribution systems.

Yet a further object of the invention is to provide a partially cured pipe suitable for advanced gas distribution systems which is sufficiently flexible before installation to be spooled or folded for storage.

Still another object of the invention is to provide a pipe suitable for advanced gas distribution systems which is easily manufactured.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of both portions of a composite advanced gas distribution pipe, prior to assembly, constructed and arranged in accordance with a preferred embodiment of the invention;

FIG. 2 is a cross-sectional view of the pipe of FIG. 1 being assembled;

FIG. 6 is a plan view of a joint for coupling two sections of the cured pipe of FIG. 4.

DETAILED DESCRIPTION OF THE INVENTION

Figure 3:
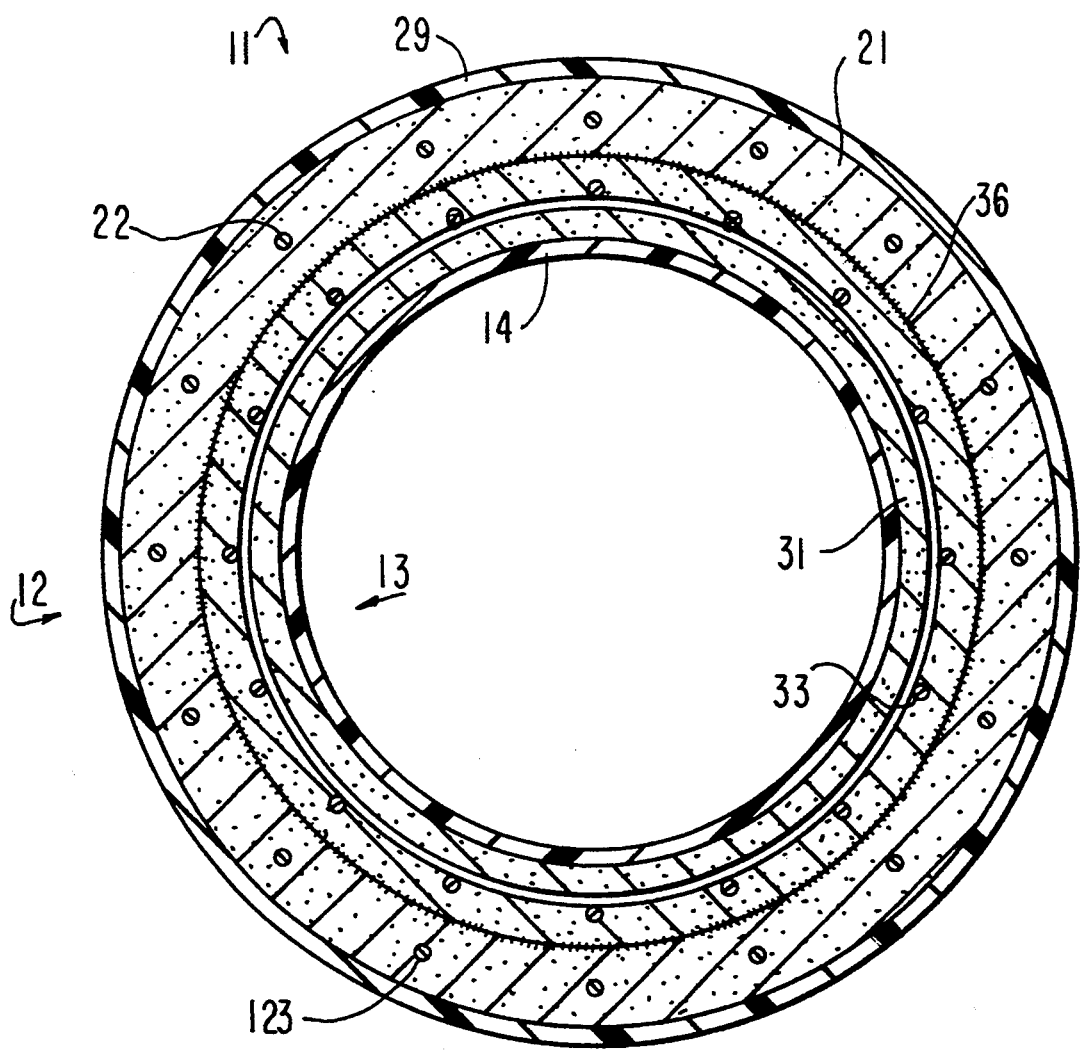
FIG. 3 is a cross-sectional view of the assembled pipe of FIG. 1.

A pipe suitable for use in advanced gas distribution systems prepared in accordance with the invention is a composite pipe formed from two tubes having different constructions. Prior to installation, the outer tube is flexible and cured and the inner tube, which is positioned within the outer tube, is uncured. The composite is thereby flexible prior to installation.

FIG. 1 illustrates a first outer tube 12 and a second inner tube 13 of a composite pipe 11, prior to assembly, in accordance with an embodiment of the invention. Throughout the application, equivalent structures shown in different figures will be assigned the same reference numerals. Prior to a final cure step conducted after assembly of the two tubes and installation of pipe 11, pipe 11 is sufficiently flexible that it may be easily stored by spooling or layering for convenient storage prior to installation. In a preferred embodiment, pipe 11 is not sufficiently rigid to support itself in a round shape and will collapse on itself to the shape of a deflated fire hose. Outer tube 12 is flexible and is formed of a felt flexible hose impregnated with cured elastomeric material. Outer tube 12 is highly impact resistant. Composite pipe 11 may also include a leak detection system, an example of which will be described in greater detail below.

Inner tube 13 is also a felt tube and is impregnated with uncured resin which is cured after installation. The inner surface of assembled inner tube 13 has an inner layer of gas impermeable and styrene resistant resin 14. The outer surface of inner tube 13 can be coated with a heat sensitive adhesive 36, which is activated upon curing of tube 13, to bond inner tube 13 to outer tube 12. It is important to prevent gas migration passages between inner tube 10 and outer tube 12 so that the location of leaks can be pinpointed more easily. However, because the uncured resin of the inner tube is in contact with the inner surface of outer tube 12 when it is cured, a suitable bond can be formed to eliminate the possibility of gas migration and adhesive 36 is not required. Suitable resins for preventing gas migration include vinyl ester resins.

Outer tube 12 is preferably a multi-layer construction. Outer tube 12 includes a carrier portion 21 having a fibrous sheet structure including a matte, web or randomly oriented fibers. The fibers can include glass and/or natural and synthetic fibers and they may be of different denier. A felt-like mat or web or randomly oriented fibers is particularly well suited for receiving acceptable quantities of resin so that a wetted out web or mat absorbs an effective amount of resin to provide a flexible impact resistant tube. Outer tube 12 can also include an outer resin layer 29.

In the preferred embodiment of the invention, carrier portion 21 is a polyester needled felt which is reinforced in the longitudinal direction along the axis with a plurality of longitudinal reinforcing strands 22. Carrier portion 21 may be fabricated as a single layer of felt or formed of two layers of polyester felt with reinforcing strands 22 laid on the outer side of a first layer and a second layer about the first layer. Reinforcing strands 22 may be organic or inorganic materials, such as steel, synthetic fibers, such as aramide, polyester or the like, or of glass. At least one of such strands can be a metal wire 123 so that pipe 11 can be located with a metal detector after it is buried.

Figure 4:
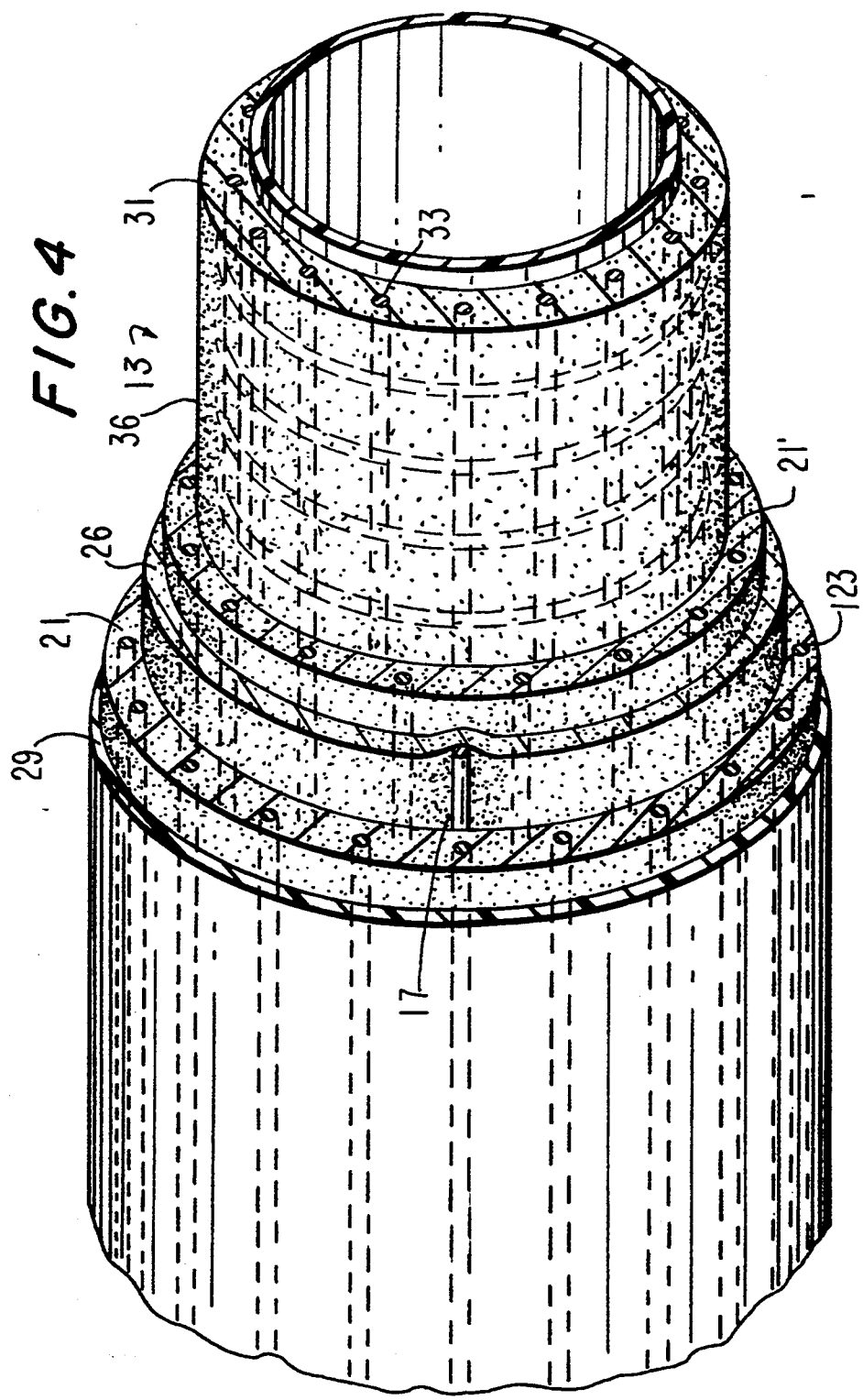
FIG. 4 is a perspective view partially cut away view of an advanced gas distribution pipe constructed in accordance with a preferred embodiment of the invention.

Referring to FIG. 4, when a leak detection system is included, an additional thin layer of polyester needled felt 26 can be placed under carrier portion 21. Thin felt layer 26 is preferably between about 1 and 2 mm in thickness and does not include any resin. A leak detection wire 17 is inserted longitudinally against felt liner 26. A second impregnated carrier tube 21', having similar construction as carrier 21 is disposed on the inside of felt liner 26. Carrier 21' is treated in the same manner as carrier 21.

Carrier portion 21 (as well as carrier 21') is impregnated with an elastomeric thermosetting resin, such as allyl, bismaleimide, epoxy, phenolic, polyester, polyamide, polyurethane or silicone resins in combinations thereof which will cure upon application of ultrasonic or ultraviolet energy. Thermosetting unsaturated polyester resin compositions are particularly well suited to be included in carrier portion 21. Preferably, the resin is a polyester/polyurethane elastomer which will upon curing, provide a highly impact resistant flexible hose-type structure. Synthetic resin material suitable for use for impregnating carrier 21 are set forth in detail in my copending application Ser. No. 07/703,265, which disclosure is incorporated herein by reference.

After the various components of outer tube 12 are assembled, the resin in carrier portion 21 is cured to produce an impact resistant flexible hose-type tube. Longitudinal reinforcing strands 22 prevent elongation of tube 12 when assembled composite pipe 11 is pulled in a longitudinal direction during installation.

FIG. 3 is a cross-section showing the composite structure of assembled composite pipe 11, shown round, which will be the form after curing. Prior to curing, inner tube 13 is soft and will collapse under its own weight. Inner tube 13 includes a resin carrier layer 31 which is preferably a polyester needled felt tube comparable to carrier 21. Carrier 31 is impregnated with an elastomeric resin, preferably a polyester/polyurethane resin. The polyester/polyurethane resin impregnation in carrier 31 is of a composition which will, after curing, be more rigid than the resin impregnated in carrier 21 of outer tube 12.

Carrier 31 is reinforced in both the longitudinal and radial direction with a reinforcing sock 33. Reinforcing sock 33 is shown in the mid-section of carrier 31, but may be positioned at other locations.

In one of the preferred methods of fabricating inner tube 13, a synthetic resin layer 14 including any of nylon, polyethylene or SURLYN for example, is disposed about the outside surface of carrier 31. SURLYN is a synthetic thermoplastic resin available from E. I. dupont de Nemours and Co. The inside and outside surfaces will then be reversed when inner tube 13 is inserted and everted inside outer tube 12 when pipe 11 is assembled. Thus, synthetic resin layer 14 will become the inside wall of inner tube 13 and carrier 31 will be on the outside as illustrated in FIG. 2.

In an alternative embodiment of joining inner tube 13 to outer tube 12, the relative location of synthetic resin layer 14 and carrier 31 will be reversed. In this embodiment, inner tube 13 will then be simply pulled inside outer tube 12. The resin in carrier 31 remains uncured at this time. Since outer tube 12 is flexible and inner tube 13 which contains a more rigid resin that is uncured, pipe 11 at this time is flexible so that it can be readily spooled or folded for storage prior to installation.

Outer tube 12 is dimensioned so that the nominal inner diameter is less than the nominal outer diameter of inner tube 13. During installation, a fluid such as water under sufficient pressure inflates inner tube 13 forcing it to a substantially round configuration. This also expands flexible outer tube 12. While maintaining this pressure within inner tube 12, the uncured resin of carrier 31 is cured. During curing of the resin, inner carrier 31 is securely bonded in a gas-tight fashion to outer carrier 21. Pressure is maintained until the resin in inner tube 13 is fully cured.

The generation of ultrasound waves suitable for curing the resin in inner tube 13 is fully set forth in my prior application. Alternatively, curing can be initiated by ultraviolet radiation or heat.

Figure 5:
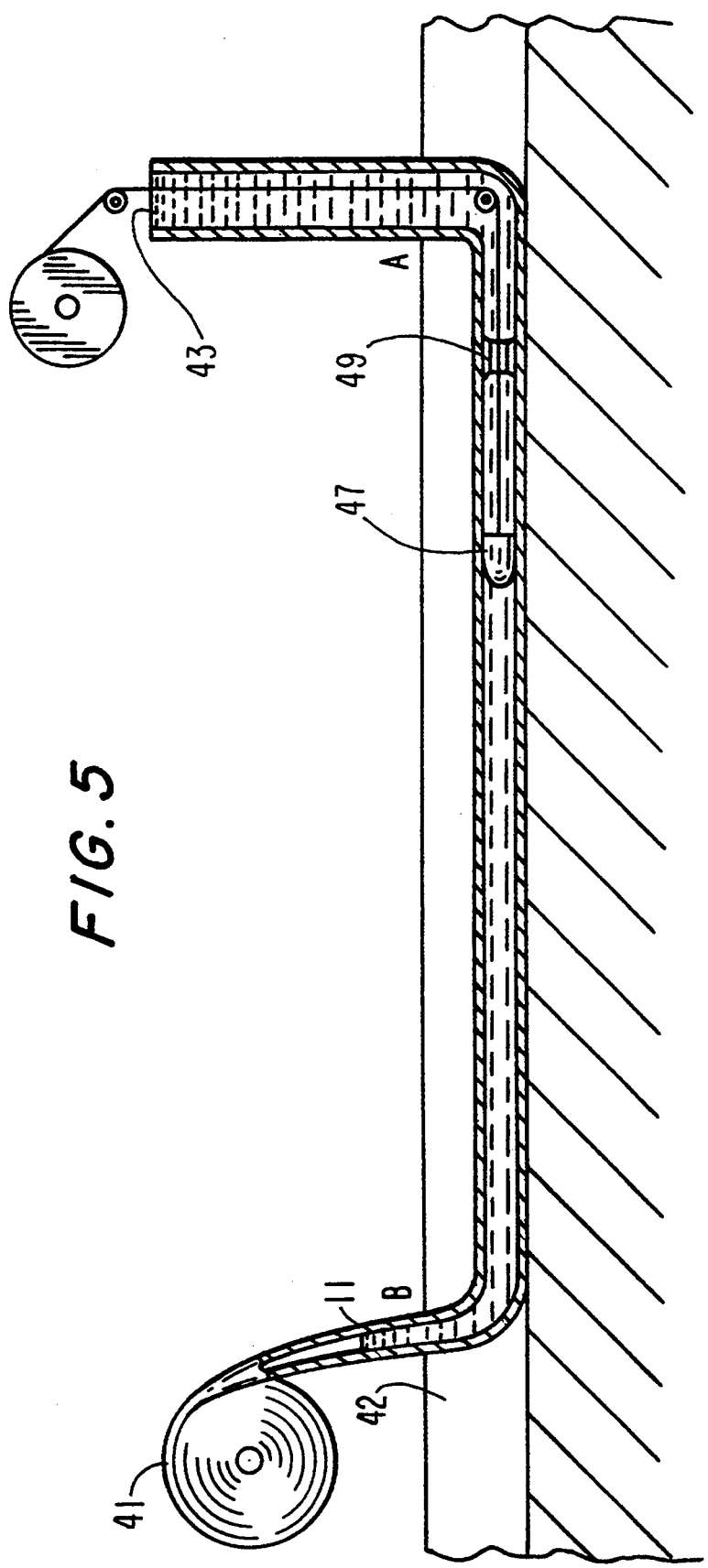
FIG. 5 is a view in schematic illustrating installation of the advanced gas distribution pipe of FIG. 1.

FIG. 5 illustrates installing pipe 11 in accordance with an embodiment of the invention. A supply of pipe 11 is stored on a spool 41 and uncoiled into a trench 42 from a first position A to a second position B. A fluid such as water 43 is pumped into pipe 11 at position A from a water supply and a pig 47 is inserted into pipe 11. Behind pig 47 is anchored an ultrasonic curing device 49 of the type illustrated in my prior application. The pressure head of water 43 in pipe 11 forces pig 47 forward and expands pipe 11. The pressure behind pig 47 can be controlled by adjusting the height of pipe 11 at position A or the height of the water level within pipe 11 at position A.

An energy source provides power to ultrasonic curing device 49. As pig 47 is forced through the full length of pipe 11 and pipe 11 is rounded to its full nominal dimension limited by sock 33, ultrasonic curing device 49 cures the resin carrier 31 of inner tube 13. Since inner tube 13 has a larger nominal outer diameter than the nominal inner diameter of outer tube 12, outer tube expands since it is more elastic. During curing, outer tube 12 is bonded to inner tube 13. After curing is complete, pig 47 and ultrasonic curing device 49 are removed and pipe 11 is ready for coupling.

Coupling of a length of pipe 11 to an additional length (or gas manifold) is readily accomplished as shown in FIG. 6. After curing inner tube 13, outer tube 12 is cut back a small distance on both ends to be joined and end segments 18 of inner tubes 13 are butted. A sleeve 60 is used to cover end segment 18. Sleeve 60 can be similar in construction to a short length of impregnated and cured carrier 21. The joint is then wrapped with a gas impermeable resin tape 19. The joint provides a convenient outlet for gas detection wire 17.

By providing a partially cured composite pipe in accordance with the invention, a readily coilable pipe suitable for use in advanced gas distribution systems is provided. The pipe is a composite which includes an impact resistant outer tube and a partially cured inner tube. The uncured resin in the inner tube can be formulated to provide a cured pipe which will be as hard as polyethylene pipe after curing. This pipe meets all the criteria established for pipes to be used in advanced gas distribution systems yet is readily coilable for convenient storage prior to installation. Curing during installation is readily accomplished by use of heat or ultrasonic curing, for example. Use of microencapsulated catalysts in the resin will permit extended shelf life of assembled pipe before installation and easy curing by ultrasound.

It will thus be seen that the objects set forth above, among those made apparent from the preceding description, are efficiently attained and, since certain changes may be made in carrying out the above method and in the pipe and apparatus set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A pipe which can be fabricated in sufficiently long lengths suitable for use in advanced gas distribution systems and sufficiently flexible for storage prior to installation and curing, comprising:
   a first outer fibrous carrier tube of a first dimension impregnated with a cured impact resistant flexible elastomeric resin, the fibrous carrier reinforced with first longitudinal reinforcing means for limiting longitudinal stretch of the pipe;
   a second inner fibrous carder tube of a second dimension impregnated with an uncured elastomeric resin which is more rigid, when cured, than the resin in the first tube;
   the second tube having a nominal outer diameter greater than the nominal inner diameter of the outer tube, the second tube positioned within the first tube;
   the second tube reinforced in the longitudinal and radial directions with second reinforcing means for limiting elongation and radial expansion of the second tube, the second tube coated on at least the inside surface away from the outer tube with a gas impermeable and styrene resistant synthetic resin layer.

2. The pipe of claims 1, wherein the outer tube is a multi-layer structure including gas leak detection means for locating gas leaking from the inner tube.

3. The pipe of claim 2, wherein the gas leak detection means include a thin layer of felt and a gas detecting wire in contact with the thin layer of felt.

4. The pipe of claim 1, where the fibrous carrier includes polyester needled felt.

5. The pipe of claim 1, wherein the second reinforcing means includes a net-like sock within the fibrous carrier.

6. The pipe of claims 1, wherein the elastomeric resin of the second tube includes at least one of polyester and polyurethane.

7. The pipe of claim 1, wherein the impermeable layer includes at least one polymer selected from the group consisting of nylon, polyethylene and SURLYN.

8. The pipe of claim 1, wherein the pipe is curved and layered over itself.

9. The pipe of claim 1, including heat activated adhesive between the outer and inner tubes.

* * * * *